United States Patent
O'Toole et al.

(10) Patent No.: US 10,443,615 B2
(45) Date of Patent: Oct. 15, 2019

(54) ALIGNMENT OF FLANGED COMPONENTS

(71) Applicant: ROLLS-ROYCE plc, London (GB)

(72) Inventors: James A C O'Toole, Derby (GB);
James Holt, Kempston (GB)

(73) Assignee: ROLLS-ROYCE plc, London (GB)

( * ) Notice: Subject to any disclaimer, the term of this patent is extended or adjusted under 35 U.S.C. 154(b) by 535 days.

(21) Appl. No.: 15/154,396

(22) Filed: May 13, 2016

(65) Prior Publication Data

US 2016/0341214 A1    Nov. 24, 2016

(30) Foreign Application Priority Data

May 19, 2015    (GB) .................................. 1508550.9

(51) Int. Cl.
*F04D 29/52*    (2006.01)
*F04D 29/64*    (2006.01)
*F01D 25/24*    (2006.01)

(52) U.S. Cl.
CPC ......... *F04D 29/522* (2013.01); *F01D 25/243* (2013.01); *F04D 29/644* (2013.01); *F05D 2220/32* (2013.01); *F05D 2230/64* (2013.01); *F05D 2250/184* (2013.01); *Y02T 50/671* (2013.01)

(58) Field of Classification Search
None
See application file for complete search history.

(56) References Cited

U.S. PATENT DOCUMENTS

| | | | |
|---|---|---|---|
| 3,932,153 A | | 1/1976 | Byrns |
| 5,569,018 A | * | 10/1996 | Mannava ................ B23P 6/002 148/525 |

FOREIGN PATENT DOCUMENTS

| | | | |
|---|---|---|---|
| GB | 2192677 A | | 1/1988 |
| GB | 2 488 803 A | | 9/2012 |
| JP | H0995257 A | | 4/1997 |
| JP | 11051259 A | * | 2/1999 |
| JP | H1151259 A | | 2/1999 |

OTHER PUBLICATIONS

Oct. 26, 2015 Search Report issued in British Patent Application No. GB1508550.9.
Dec. 6, 2016 Search Report issued in Great Britain Application No. 1608428.7.

* cited by examiner

*Primary Examiner* — Igor Kershteyn
*Assistant Examiner* — Juan G Flores
(74) *Attorney, Agent, or Firm* — Oliff PLC (57) ABSTRACT

A component including a first flange located in a first section of the component, the first flange including a contact surface. The component also including a second flange located in a second section of the component. The first flange is configured to attach to the second flange, and the second flange includes a contact surface configured to contact the contact surface of the first flange. The contact surface of the first flange and the contact surface of the second flange each has an undulating surface profile, where each undulating surface profile is defined by at least one peak point and at least one trough point connected by a curved line extending in at least one of a radial or a circumferential direction relative to a central axis of the component.

16 Claims, 5 Drawing Sheets

ALIGNMENT OF FLANGED COMPONENTS

BACKGROUND OF THE INVENTION

The present invention relates to improving alignment between flanged components during assembly, for example improving the alignment of semi-circular split casings or whole circumference stack casings such as those used in the compressor stages of a gas turbine engine.

Gas turbine engines typically employ a multi-stage axial compression system for compression of air passing through the engine. A fan at the front of the engine provides initial low pressure compression, before Intermediate and High Pressure Compressors housed within the body of the engine further increase the pressure to the levels required at the combustor.

For ease of assembly and manufacture, the generally cylindrical Intermediate Pressure Compressor (IPC) within a gas turbine engine is made up of two semi-circular split casing segments which are attached together using bolted flanges.

Typically, the two halves of the split casing structure are bolted together with the flange surfaces parallel to each other. The concentric and axial location of one half of the compressor split casing structure relative to the other half is provided only by the bolts passing through the flange bolting holes.

Similarly, advantageous assembly considerations mean that High Pressure Compressors (HPCs) are also typically formed in sections. Rather than being formed from semi-circular split casing segments, HPCs are typically assembled as a series of whole circumference stack casing segments in order to enhance the hoop strength of the casing assembly. However, the stack casing segments are still typically connected together via bolted flanges (provided around their circumference), and the rotational and concentric alignments of the stack casings relative to each other are similarly solely provided by the bolts passing through the flange bolting holes.

Both IPC and HPC casings are provided with an abradable liner which is machined, in one of the final machining processes of the casings, with the aim of achieving a tight roundness tolerance on the liner inner diameter of the casing. In order to carry out this machining process, the casings are assembled around the turning machine and the abradable liner is turned to size. The casing segments are then disassembled from each other to allow the casing to be removed from the turning machine, and are then re-assembled around the compressor drums during the engine build.

The tight liner inner diameter roundness tolerance achieved in the casing liner machining process can only be maintained if consistent location and orientation of each segment relative to the other segments in a casing assembly can be ensured for the first and subsequent assembly processes. This roundness tolerance is fundamental in achieving required compressor tip clearances, and so has a large influence on compressor efficiency. It is clearly beneficial, therefore, to ensure that the tolerances are maintained in the fully assembled engine.

Unfortunately, the required repeatability of assembly is not currently achieved on either the IPC split casings and HPC stack casings. The disassembly and subsequent re-assembly of the casing segments of either the HPC or IPC provides an opportunity for misalignment of the segments after liner machining process, due to required tolerances between the bolts and the flange bolting holes and the absence of other means of providing location of one segment of the split casing structure relative to another. The bolted flanges in the IPC do not ensure repeatability of axial or concentric alignment between the two halves of the split casing, and the bolted flanges in the HPC do not ensure repeatability of rotational or concentric alignments between the stack casings.

Curvic couplings are one known way of ensuring alignment between two components. Curvic couplings have a self-alignment tendency when the two halves of the coupling are brought together, and the square tooth profile would provide location features between the compressor segments to ensure repeatability in compressor casing segment alignment.

However, there are a number of drawbacks associated with the use of curvic couplings, a selection of which are provided below.

1. The curvic teeth are expensive and timely to machine due to the small radii associated with the square tooth profile, and a brazing process is required to attach the curvic teeth.
2. The machines required to implement such an attachment are very specialised and expensive.
3. A thick flange is required in order to allow for connection between each curvic surface. This is detrimental in terms of weight.
4. Curvic square tooth profile results in stress concentrations in the structure.
5. When the two halves of the curvic coupling are brought together there is a risk of denting the surface resulting in either a non-optimal alignment or the need for the coupling to be replaced.
6. Curvic couplings cause issues in terms of repair and overhaul. It is standard protocol to inspect every curvic coupling—this often leads to their replacement due to curvic teeth getting damaged when taken apart.

Accordingly, it is an aim of the present invention to provide an alternative solution to the problem of providing repeatable alignment between casing segments or other flanged components which overcomes or mitigates some or all of these drawbacks.

BRIEF SUMMARY OF THE INVENTION

According to a first aspect of the invention there is provided a component having a central axis and being formed in two or more sections, a first section comprising a first flange for attachment to a second flange provided on a second section, the first flange having a contact surface for contact with a contact surface of the second flange, wherein the contact surfaces of the first and second flanges are provided with corresponding undulating surface profiles, the undulating surface profiles being defined by one or more high points and one or more low points connected by a smooth radius curve extending in at least one of an axial, radial or circumferential direction relative to the central axis of the component.

The undulating surface profile may be defined by a smooth radius curve extending in a radial direction relative to the central axis.

The first and second flanges may be coaxial with the central axis and the undulating surface profile may be defined by a smooth radius curve extending in a circumferential direction relative to the central axis.

The first and second flanges may be parallel with the central axis and the undulating surface profile may be defined by a smooth radius curve extending in a axial direction.

A plurality of high points and/or low points may be connected by smooth radius curves to define a wavy surface on the contact surface of each flange.

The smooth radius curve may be sinusoidal.

Each undulating surface profile may be approximated by $z=A\cdot\text{Cos}(Bx)\cdot\text{Cos}(Cy)$.

The wavelength of the smooth radius curves may vary in the radial direction.

The wavelength of the smooth radius curves may vary in the axial direction.

The wavelength of the smooth radius curves may vary in the circumferential direction.

The first section may additionally comprise a third flange having a contact surface for contact with a contact surface of a fourth flange, wherein the contact surfaces of the third and fourth flanges are provided with corresponding undulating surface profiles, the undulating surface profiles being defined by one or more high points and one or more low points connected by a smooth radius curve extending in at least one of an axial, radial or circumferential direction relative to the central axis of the component.

The fourth flange may be provided on the second section of the component.

The fourth flange may be provided on a third section of the component.

The corresponding surface profiles of the first and second flanges may be dissimilar from the corresponding surface profiles of the third and fourth flanges.

A surface of each flange opposite to its contact surface is machined to similar surface profile to said contact surface.

The invention aims to maintain the bolted flange attachment feature between compressor casing segments but instead of having flat inner flange surfaces machine a smooth 3D surface on said surfaces.

This will limit the number or way in which adjacent segments can interface, ensuring that the compressor segments can only interface in one or more specific orientations relative to each other. The 3D surface therefore ensures repeatability in alignment of segments relative to each other during casing assembly.

The profile may be smooth or 'wavy'. In other words, the imposed geometry would have a large minimum radius which is economical to machine and minimises stress concentrations in the finished parts.

The thickness of the flange may be made constant by machining the upper flange surface with a corresponding or similar profile.

On an inner flange surface, by overlaying a sinusoidal profile in the radial and/or axial directions, a 3D 'wavy' inner flange surface can be generated which will provide radial and/or axial location features and thus improve said repeatability in concentric and/or axial alignment between segments.

This profile may result in a surface that can be approximated as $z=A\cdot\text{Cos}(Bx)\cdot\text{Cos}(Cy)$; where A, B and C are all constants, and at least A may be less than 1 to ensure a smooth profile.

Alternatively, some other form of smooth wavy surface could be provided, that need not be repeating.

In order to achieve repeatability in the concentric alignment of segments, a sinusoidal profile in the radial direction can be implemented on the inner surface of the bolted flange.

In order to achieve repeatability in the rotational alignment of segments, a gradient of the wavelength of the said radial sinusoidal profile in the circumferential direction could be implemented. A varying number of peaks and troughs would thereby be provided around the circumference of the flange to ensure that the stack casing segments can only interface in one rotational orientation.

In either case, the outer flange surface can also be machined to correspond to the inner flange surface in order to maintain a constant flange thickness. This reduces the weight of the assembly, which is of particular interest in aerospace applications.

A number of advantages may be achieved by an arrangement as hereinbefore described. These advantages may include one or more of the following:

1. Repeatability in alignment between casing segments of the IPC and HPC. This ensures that the tight roundness tolerance of the casing liner inner diameter, achieved in the casing liner machining process, is maintained when the casing segments are re-assembled into the engine. This will enhance the sealing of the compressor and improve compressor efficiency and operability.
2. Economical machining. Due to the large minimum radius of the imposed flange surface geometry, the associated machining process is economical.
3. Minimal stress concentrations, by providing a large minimum radius to the surface geometry.
4. Flange thickness can be maintained by machining the upper flange surface to allow for weight saving.
5. Self-alignment without the risk of damaging the mating surface.
6. Capability for adaptive/offset machining.
7. Mitigates the occurrence of flange slippage due to thermal mismatch which would result in a leakage benefit.
8. Expected greater ease in overhauling than curvic couplings.
9. Potential for modified geometries to be machined on development casing segments to ensure that they cannot interface with production casing segments, thus completely mitigating the risk of part contamination.

Also provided is a method of manufacturing a compressor for a gas turbine. The use of a casing with flanges as previously described helps to ensure repeatable alignment of components throughout the manufacturing process.

Wherever practicable, any of the essential or preferable features defined in relation to any one aspect of the invention may be applied to any further aspect. Accordingly the invention may comprise various alternative configurations of the features defined above.

Although generally described in relation to compressor casings for IPCs and HPCs, the present invention would also provide similar benefits to any flanged surface, whether in aerospace applications or otherwise. The invention could also be employed to replace existing curvic couplings, providing benefits in terms of resilience and maintenance.

BRIEF DESCRIPTION OF THE DRAWINGS

Practicable embodiments of the invention are described in further detail below by way of example only with reference to the accompanying drawings, of which.

DETAILED DESCRIPTION OF THE INVENTION

Figure 1:
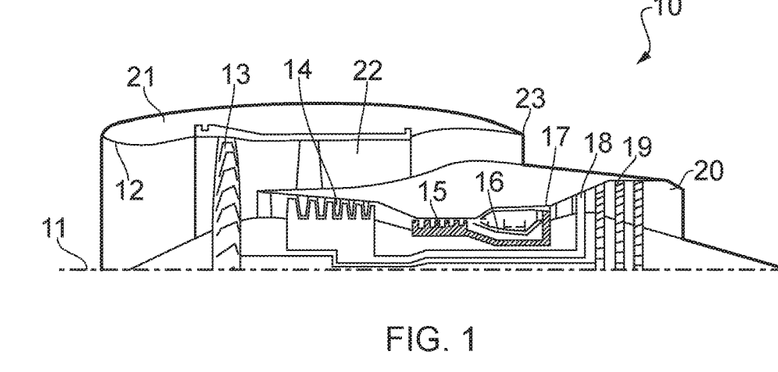
FIG. 1 shows a schematic view of a gas turbine engine.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor (IPC) 14, a high-pressure compressor (HPC) 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in a conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

Alternative gas turbine engine arrangements may comprise a two, as opposed to three, shaft arrangement and/or may provide for different bypass ratios. Other configurations known to the skilled person include geared turbofan engines, open rotor designs, such as turboprop engines, or else turbojets, in which the bypass duct is removed such that all air flow passes through the core engine. In certain configurations, the torque from one or more engine shaft may be used to generate electrical power instead of, or in addition to, driving airflow. The various available gas turbine engine configurations are typically adapted to suit an intended operation which may include aerospace, marine, power generation amongst other propulsion or industrial pumping applications.

Figure 2:
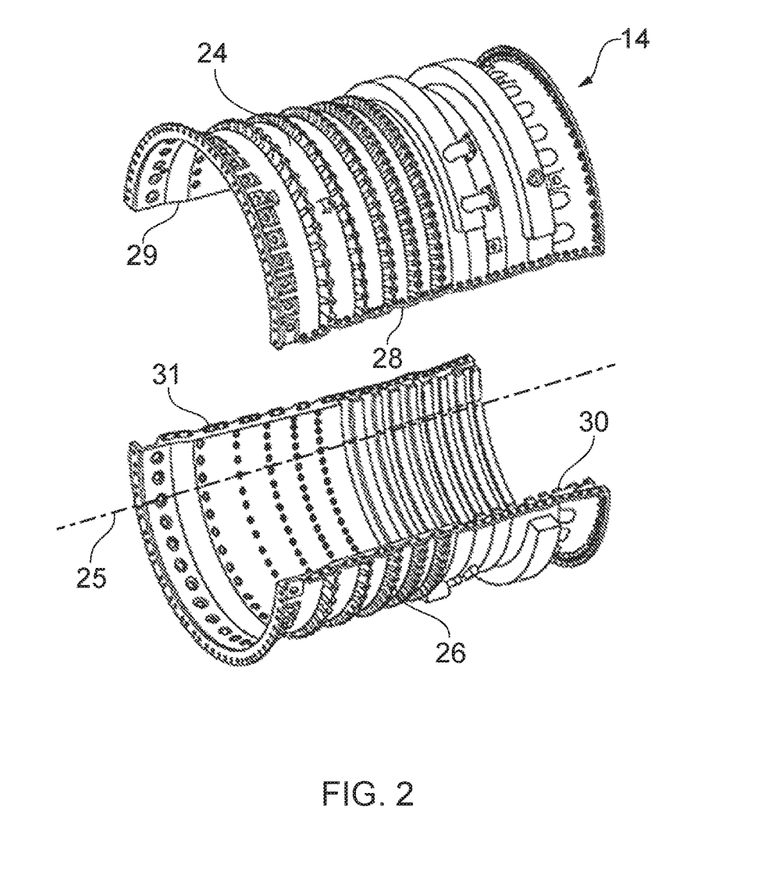
FIG. 2 shows an example of a split casing from an Intermediate Pressure Compressor (IPC)

The intermediate pressure compressor (IPC) casing 14 is shown in isolation in FIG. 2. For ease of manufacture, the casing 14 is made up of two semi-circular split casing segments 24,26 which are bolted together using flanges 28,29,30,31 provided along the edges of each segment which are parallel with the longitudinal axis 25 of the casing 14.

Figure 3:
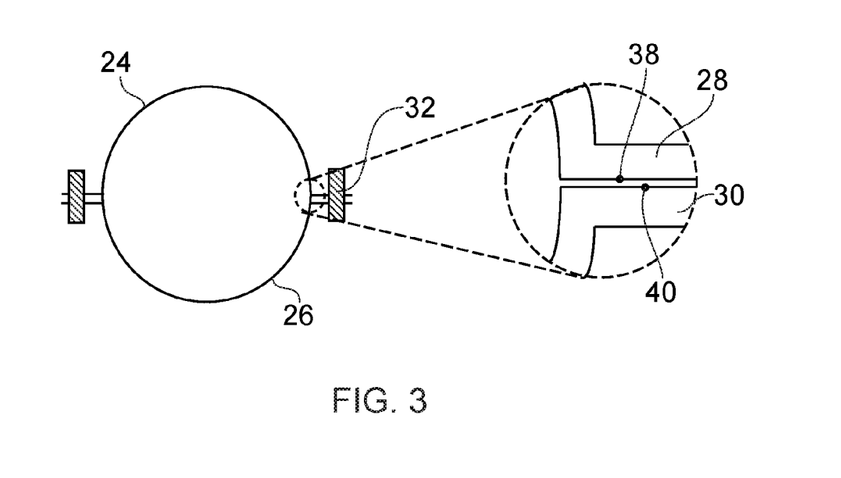
FIG. 3 shows a schematic view of a bolted flange attachment between the two halves of the split casing from FIG. 2.

The interface between the two segments 24,26 is shown schematically in FIG. 3, with bolts 32 illustrated joining the two flanges 28,30. Significantly, the inner or contact surfaces 38,40 flanges, ie the lower surface 38 of the upper flange 28 and the upper surface 40 of the lower flange 30 which form the interface between the two flanges 28,30, are completely flat. Accordingly, the flanges 28,30 are able to slide relative to one another when in contact, this lateral movement only being restricted by the presence of the bolts 32 holding the flanges 28,30 together. Once fully tightened, the bolts 32 effectively prevent any sliding movement of the flanges 28,30. However, there is necessarily a clearance provided between the bolts 32 and the holes 34,36 provided in the flanges 28,30, so the holes 34,36 will not necessarily be aligned during assembly.

Figure 4:
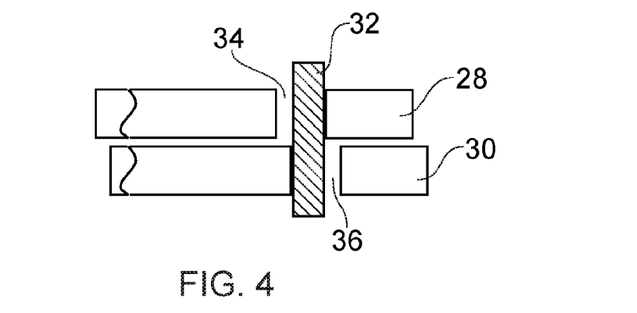
FIG. 4 shows an exaggerated schematic view of bolting hole tolerances.

This is illustrated schematically in FIG. 4, where the bolt 32 is engaged with the left hand edge of the hole 34 in the upper flange 28, and the right hand edge of the hole 36 in the lower flange. The bolt 32 can provide no more precise location between the flanges 28,30 due to the required clearance, and no meaningful resistance to movement or locating feature is provided by the flat inner surfaces 38,40 of the flanges 28,30.

Figure 5:
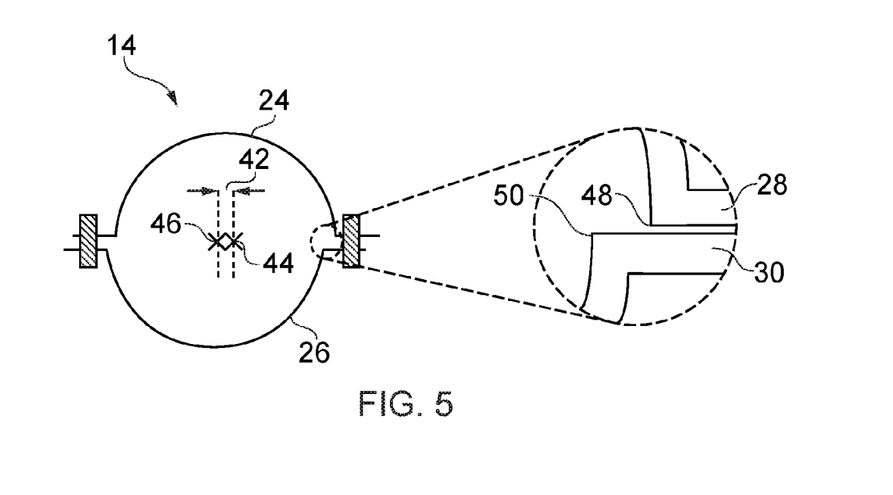
FIG. 5 shows an exaggerated schematic view of a misalignment between two halves of a split casing as shown in FIG. 2.

The consequences of this misalignment are illustrated in FIG. 5. The upper segment 24 of the casing 14 is shifted to the right relative to the lower segment 26, meaning that the effective centres of the two casing segments 24,26 are not aligned. The degree of misalignment 42 between the effective centre 44 of the upper casing segment 24 and the effective centre 46 of the lower casing segment 26 is exaggerated for clarity in FIG. 5. Nonetheless, it will be appreciated that when working with tight tolerances any degree of misalignment 42 will be problematic. In particular, as shown in FIG. 5, a discontinuity in the circular profile of the inner surface is created at the interface between the casing segments 24,26.

The discontinuity, combined with the tight manufacturing tolerances designed into the compressor blades or discs, means that insufficient clearance will be provided around some parts of the casing, while undesirably large clearances would be experienced in others. In the magnified part of FIG. 5, the inner corner 50 of the lower flange 30 would provide insufficient clearance, and deep rubs in the abradable liner will be experienced in this area. Conversely, the increased clearance around the inner corner 48 of the upper flange 28 would result in reduced compressor efficiency and reduced operability limit.

While the misalignment can be minimised through careful and precise assembly and securing of the casing segments, it would be highly desirable to provide some form of locating feature which would ensure repeatability in compressor casing segment alignment.

Figure 6:
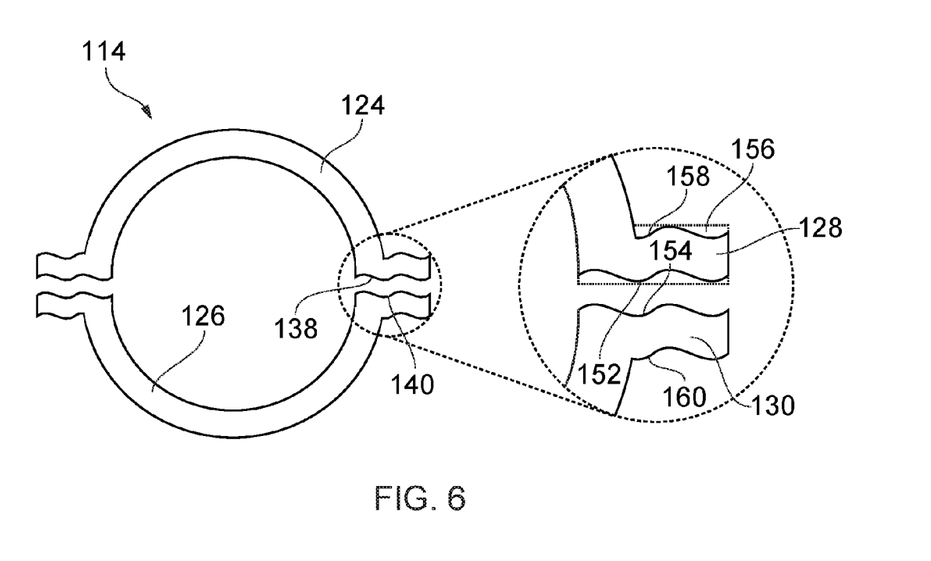
FIG. 6 shows a schematic cross section of a split casing from an IPC, incorporating a modified flange according to the present invention.

FIG. 6 shows an axial view of an IPC 114 incorporating the present invention. The IPC 114 is formed of two split casing segments 124,126 similar to those as previously described, each having a flange 128,130. However, in contrast to the flanges 28,30 shown in FIGS. 3 to 5, the inner, contact, surface 138,140 of each flange 128,130 is shaped to provide a generally sinusoidal wavy profile in the radial direction. The peaks 152 of the shaped contact surface 138 of the upper flange 128 correspond to the troughs 154 of the shaped inner surface 140 of the lower flange 130, and vice versa, to provide concentric alignment of the split casing segments 124,126.

Figure 10:
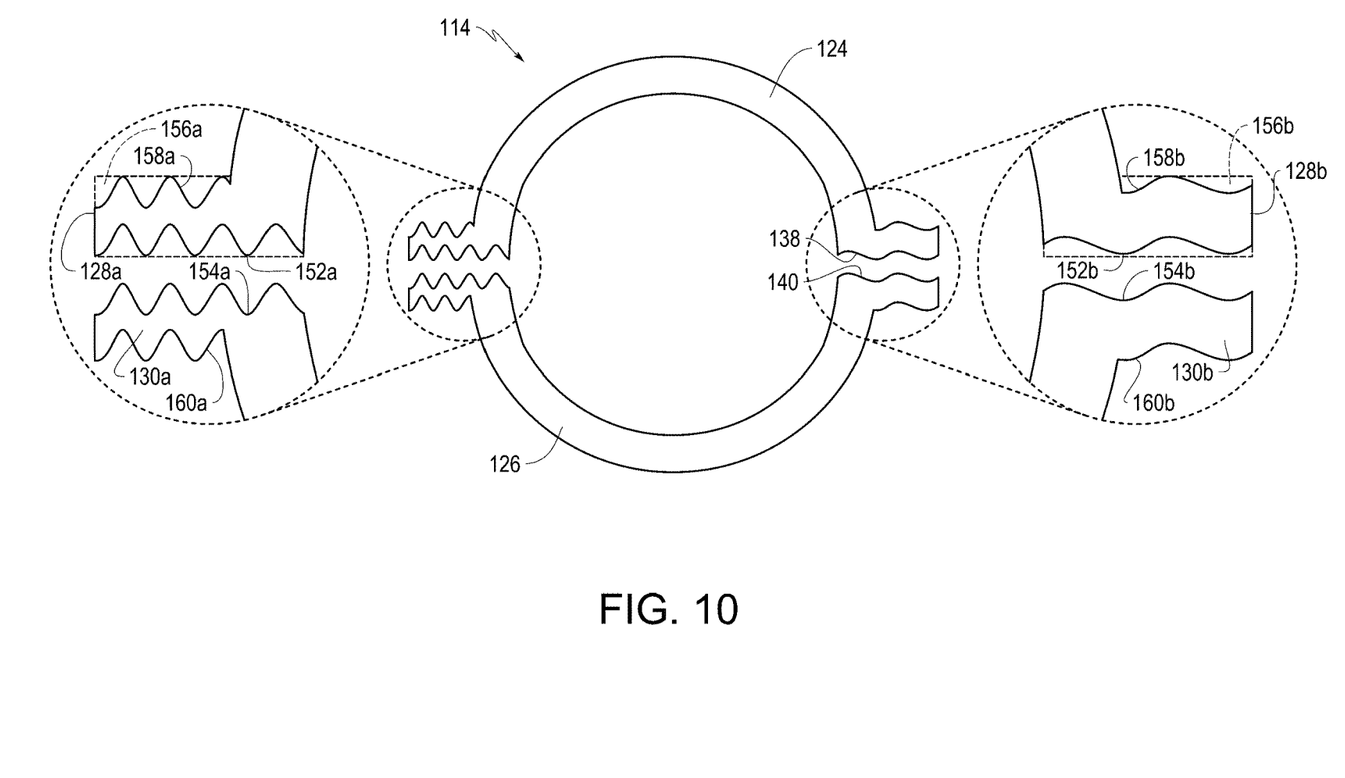
FIG. 10 shows a schematic cross section of a split casing incorporating an alternative modified flange according to the present invention.

It will be seen from FIG. 6 that the outer surfaces 158,160 of the flanges 128,130 are shaped to correspond to their inner surfaces 138,140 so that the thickness of each flange 128,130 remains substantially constant. This is beneficial in applications where weight is of critical importance, such as in the aerospace industry, as it maintains a required minimum thickness of the flanges 128,130 while removing surplus material 156 as illustrated in the enlarged portion of FIG. 6. In addition, as shown in FIG. 10, the outer surfaces 158a,160a of the flanges 128a,130a and the inner surfaces 138a,140a of the flanges 128a,130a have a different profile than the outer surfaces 158b,160b of the flanges 128b,130b and the inner surfaces 138b,140b of the flanges 128b,130b. Each pair of outer surfaces 158a, 158a,158b,160a,160b of the flanges 128a,128b,130a,130b are shaped to correspond to the respectively corresponding inner surfaces 138a,138b, 140a,140b of the flanges 128a,128b,130a,130b.

Figure 7:
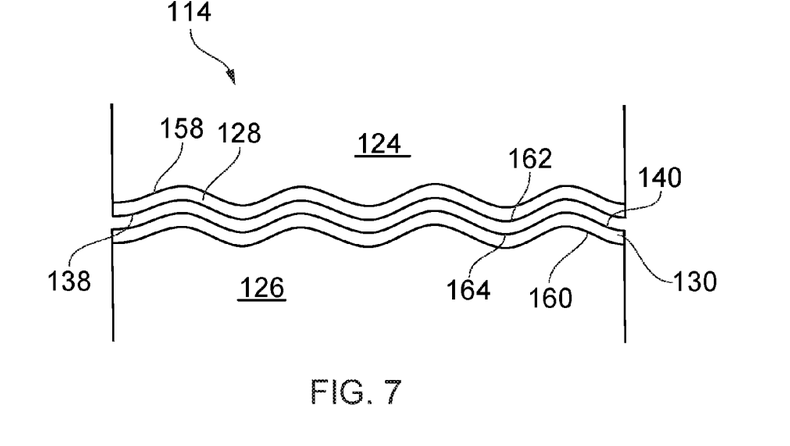
FIG. 7 shows a schematic side view of a split casing from an IPC, incorporating a modified flange according to the present invention.

FIG. 7 shows a partial side view of the IPC 114 from FIG. 6. Specifically, FIG. 7 focuses on the flanges 128,130 used to join the split casing segments 124,126. The side view of FIG. 7 shows that a generally sinusoidal profile, similar to that described in relation to FIG. 6 above, is also applied along the length of each flange 128,130 in the axial direction. As before, the peaks 162 provided by the sinusoidal profile of the inner surface 138 of the upper flange 128 correspond to the troughs 164 in the inner surface 140 of the lower flange 130, and vice versa, to provide alignment. It can also be seen that the outer surfaces 158,160 of the flange in the axial direction generally follow the inner surfaces 138,140 as shown in the radial direction in FIG. 6, for reasons already described.

The IPC 114 shown in FIGS. 6 and 7 thus incorporates a 'wavy' interface surface on its flanges in both the axial and radial directions. The surface profile can be approximated as z=A·Cos(Bx)·Cos(Cy); where A, B and C are all constants. In order to maintain a smooth large radius to the curves provided on the surface, constant A is kept small, preferably less than one. Independent modification of constants B and C modifies the period of the wave in the axial and/or radial directions.

Including such a shaped surface permits consistent and repeatable location of the split casing segments 124,126 relative to one another in both the axial and radial directions. The same principles could, however, be applied in just one direction should location in only one of the axial or radial directions be required, or should there be some reason to deliberately permit sliding between the casing segments in one or other direction.

A repeating profile creates the possibility of more than one engagement position between the split casing segments 124,126. This possibility could be avoided by using an irregular or non-repeating profile. However, using a generally sinusoidal profile simplifies manufacturing, and by selecting a suitable period the number of possible engagement positions can be easily limited at least to the point where only one position will correspond with the alignment of bolt holes provided in the flanges 128,130.

The invention has so far been described in relation to semi-circular split casings, for example as used in IPCs. It will be readily understood, however, that misalignment, similar to the misalignment 42 illustrated in FIG. 5, could also arise between adjacent whole circumference stack casing segments such as are typically used to form HPC casings. Such a misalignment would similarly cause areas of insufficient clearance, where the casing liner would be damaged or eroded by the compressor, and corresponding areas of excessive clearance leading to reduced compressor efficiency.

Figures 8A, 8B:
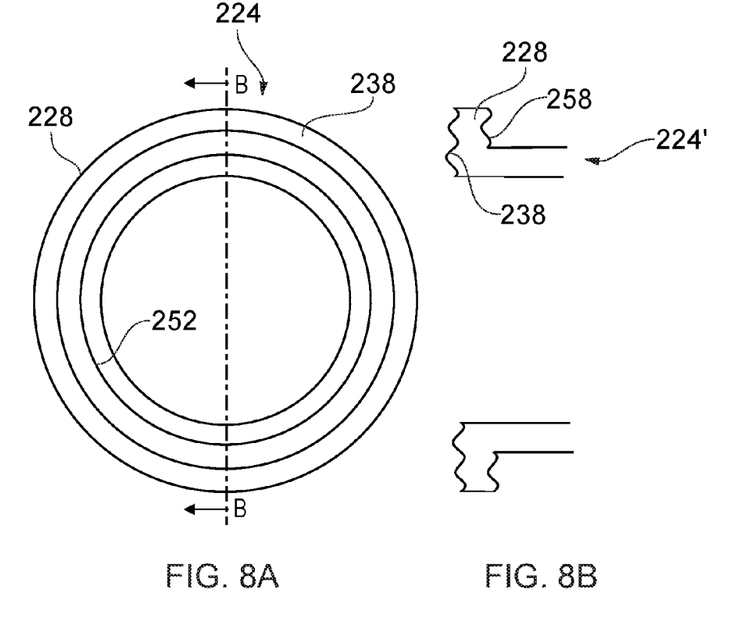
FIGS. 8A and 8B show schematic views of a modified flange according to the present invention provided on a High Pressure Compressor (HPC) casing segment.

FIGS. 8A and 8B illustrate a first example of the application of the present invention to a casing segment of this type. FIG. 8A is a schematic axial view of a whole circumference stack casing segment 224 from an HPC casing, showing the inner surface 238 of a flange 228 (the inner surface 238 being the contact surface which will, in use, engage with the contact surface of a flange of an adjacent casing segment).

The inner surface 238 of the flange 228 is provided with a generally sinusoidal profile extending in a radial direction. The peaks 252 of the profile are shown schematically as concentric circles on the surface 238 of the flange 228. A flange of the aforementioned adjacent casing segment (not shown) will have a complementary profile on its inner surface, with troughs located to correspond to the peaks 252 of the flange 228 shown in FIG. 8A. The profile of the flange 228 can be seen more clearly in the cross-sectional view of FIG. 8B, taken in the direction indicated B in FIG. 8A.

An exaggerated wavy profile of the inner surface 238 of the flange 228 is shown in FIG. 8B, and once again the outer surface 258 of the flange 228 can be seen to correspond to this profile to maintain a constant thickness to the flange 228.

The surface profile illustrated in FIGS. 8A and 8B is sufficient to provide concentric alignment of adjacent casing segments 224, and in terms of addressing the aforementioned problems of insufficient or excessive clearance between the casing and rotating components housed within no more is required. However, there may be instances where a degree of rotational alignment between adjacent segments would also be desirable or required. Such alignment is not provided by the arrangement of FIGS. 8A and 8B.

Figures 9A, 9B:
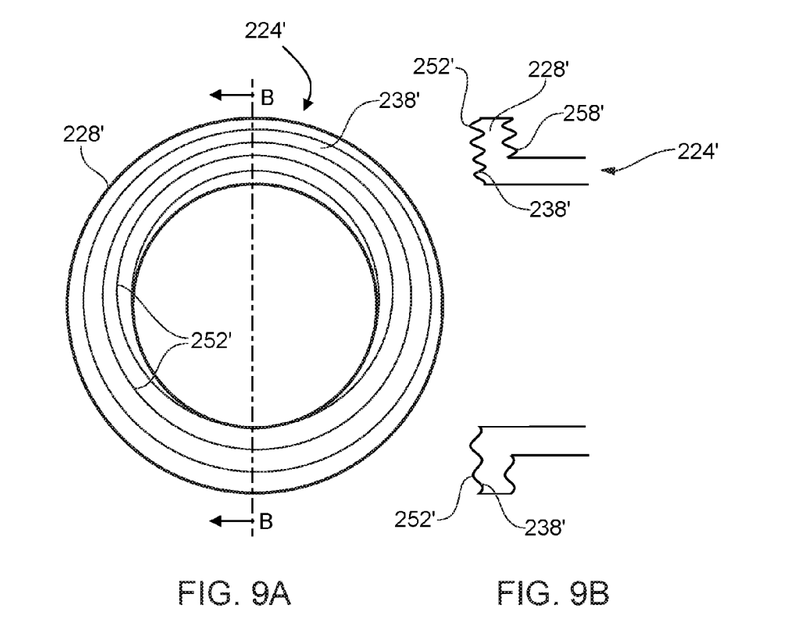
FIGS. 9A and 9B show schematic views of an alternative modified flange according to the present invention provided on an HPC casing segment.

FIGS. 9A and 9B show an alternative stack casing segment 224' provided with a flange 228' designed to provide rotational as well as concentric alignment features. The inner surface 238' of the flange 228' is again provided with a generally sinusoidal profile extending in the radial direction. However, in contrast with what is illustrated in FIGS. 8A and 8B, the period of the wave is not constant around the circumference of the flange 228'. This can be seen from the indicated peaks 252' in FIG. 9A, as well as from the cross-sectional view of FIG. 9B, where the frequency of peaks 252' on the inner surface 238' of the flange 228' is clearly higher on one side of the casing segment 224' than the other. Despite this, the outer surface 258' of the flange 228' is still machined to correspond to the inner surface 238' as previous described.

It should be clear that the assembly of the casing segment 224' illustrated in FIGS. 9A and 9B to an adjacent segment provided with a complementary profile on the inner surface of its flange would be possible in only one rotational orientation. The concentric alignment provided by the profile shown in FIGS. 8A and 8B would also be maintained.

Repeatability in the alignment of the compressor casing segments of the IPC and HPC can be improved by modifying the inner bolted flange surface to create a 3D surface to ensure that casing segments can only interface in one precise orientation. This will ensure that the tight roundness tolerance of the casing liner inner diameter, achieved in the casing liner machining process, is maintained when the casing segments are re-assembled in the engine thus improving compressor sealing clearances. Providing a large minimum radius to the flange surface geometry helps ensure that it is economic to machine, and also allows for weight saving because flange thickness can be kept constant through machining a similar profile on the opposite flange surface.

The invention claimed is:

1. A component having a central axis, the component comprising:
   a first flange located in a first section of the component, the first flange including a contact surface; and
   a second flange located in a second section of the component, the first flange being configured to attach to the second flange, the second flange including a contact surface configured to contact the contact surface of the first flange, the contact surface of the first flange and the contact surface of the second flange each has an undulating surface profile, each undulating surface profile being defined by at least one peak point and at least one trough point connected by a curved line extending in at least one of a radial or a circumferential direction relative to the central axis of the component.

2. The component according to claim 1, wherein the curved line defining the undulating surface profile extends in the radial direction relative to the central axis.

3. The component according to claim 1, wherein:
   the first flange and the second flange are coaxial with respect to the central axis; and
   the curved line defining the undulating surface profile extends in the circumferential direction relative to the central axis.

4. The component according to claim 1, wherein:
   the first flange and the second flange are parallel to the central axis; and
   the curved line defining the undulating surface profile also extends in an axial direction relative to the central axis of the component.

5. The component according to claim 1, wherein a plurality of peak points and a plurality of trough points are connected by curved lines to define a wavy surface on the contact surface of each of the first flange and the second flange.

6. The component according to claim 1, wherein the curved line is sinusoidal.

7. The component according to claim 6, wherein each undulating surface profile is approximated by $z=A\cdot Cos(Bx)\cdot Cos(Cy)$.

8. The component according to claim 1, wherein a wavelength of the curved line varies in the radial direction.

9. The component according to claim 1, wherein a wavelength of the curved line varies in at least one of the radial direction or the circumferential direction relative to the central axis of the component.

10. The component according to claim 1, wherein a wavelength of the curved line varies in the circumferential direction.

11. The component according to claim 1, further comprising:
    a third flange located in the first section of the component, the third flange having a contact surface; and
    a fourth flange having a contact surface, the contact surface of the third flange being configured to contact the contact surface of the fourth flange, wherein:
       the contact surface of the third flange and the contact surface of the fourth flange each have a corresponding undulating surface profile, and
       the undulating surface profile of each of the contact surface of the third flange and the contact surface of the fourth flange are defined by at least one peak point and at least one trough point connected by a curved line extending in at least one of a radial or a circumferential direction relative to the central axis of the component.

12. The component according to claim 11, wherein the fourth flange is located in the second section of the component.

13. The component according to claim 11, wherein the corresponding undulating surface profiles of the first flange and the second flange are dissimilar from the corresponding undulating surface profiles of the third flange and the fourth flange.

14. The component according to claim 1, wherein:
    each flange includes a second surface located opposite to the corresponding contact surface of each flange, and
    the second surface of each flange has a same surface profile as the undulating surface profile of each corresponding contact surface of each flange.

15. The component according to claim 1, wherein the component is a compressor casing for a gas turbine engine.

16. A method of manufacturing a compressor for a gas turbine engine, the compressor including the compressor casing of claim 15, the method comprising steps of:
    providing the first section and the second section of the compressor casing with an abradable liner;
    assembling the first section and the second section of the compressor casing around a turning machine;
    turning the abradable liner to a predetermined size using the turning machine;
    disassembling the first section and the second section of the compressor casing from each other to allow the compressor casing to be removed from the turning machine; and
    re-assembling the compressor casing around compressor drums to form the compressor.

* * * * *